US012597167B2

(12) United States Patent  
Chuang et al.

(10) Patent No.: US 12,597,167 B2  
(45) Date of Patent: Apr. 7, 2026

(54) SYSTEM AND METHODS FOR DETERMINING CAMERA PARAMETERS AND USES THEREOF

(71) Applicant: FD IP & LICENSING LLC, Los Angeles, CA (US)

(72) Inventors: Chia-Hsun Chuang, Los Angeles, CA (US); Brandon Fayette, Los Angeles, CA (US); Gene Reddick, San Francisco, CA (US); Roman Reddick, San Francisco, CA (US)

(73) Assignee: FD IP & LICENSING LLC, Los Angeles, CA (US)

( * ) Notice: Subject to any disclaimer, the term of this patent is extended or adjusted under 35 U.S.C. 154(b) by 0 days.

(21) Appl. No.: 19/045,239

(22) Filed: Feb. 4, 2025

(65) Prior Publication Data

US 2025/0252604 A1 Aug. 7, 2025

Related U.S. Application Data

(60) Provisional application No. 63/647,439, filed on May 14, 2024, provisional application No. 63/549,794, filed on Feb. 5, 2024.

(51) Int. Cl.  
*G06T 7/00* (2017.01)  
*G06T 7/246* (2017.01)  
(Continued)

(52) U.S. Cl.  
CPC ............... *G06T 7/85* (2017.01); *G06T 7/248* (2017.01); *G06T 7/285* (2017.01); *G06T 7/593* (2017.01);  
(Continued)

(58) Field of Classification Search  
None  
See application file for complete search history.

(56) References Cited

U.S. PATENT DOCUMENTS

| | | | | |
|---|---|---|---|---|
| 2012/0092328 A1* | 4/2012 | Flaks | .................... | G06V 20/10 |
| | | | | 345/419 |
| 2014/0285634 A1* | 9/2014 | Rhoads | ................... | G06T 15/04 |
| | | | | 348/47 |
| 2019/0158813 A1* | 5/2019 | Rowell | ................ | H04N 13/111 |

OTHER PUBLICATIONS

International Search Report and Written Opinion in corresponding application No. PCT/US2025/014467 dated Apr. 10, 2025, 26 pages.

(Continued)

*Primary Examiner* — Zhihan Zhou  
(74) *Attorney, Agent, or Firm* — Vorys, Sater, Seymour and Pease LLP; Rex W. Miller, II

(57) ABSTRACT

A system and method are disclosed for camera calibration. In an example, a first set of candidate frames and a second set of candidate frames can be received. The first set of candidate frames can be provided based on a first video of a pattern from a first camera. The second set of candidate frames can be provided based on a second video of the pattern from a second camera. A motion of the pattern across each of the first and second set of candidate frames can be analyzed to determine a time offset. The time offset can be indicative of a difference in recording time between corresponding frames from the first and second set of candidate frames that depict the pattern at a particular location. The method can include outputting the time offset to determine camera parameters of the first and second cameras based on the time offset.

26 Claims, 14 Drawing Sheets

(51) Int. Cl.
   G06T 7/285        (2017.01)
   G06T 7/593        (2017.01)
   G06T 7/80          (2017.01)
   H04N 13/293      (2018.01)
   H04N 13/296      (2018.01)

(52) U.S. Cl.
   CPC ......... H04N 13/293 (2018.05); H04N 13/296
               (2018.05); *G06T 2207/10021* (2013.01)

(56)                References Cited

OTHER PUBLICATIONS

Meyer, "Subframe Temporal Alignment of Non-Stationary Cameras," Computer Graphics Lab, TU Braunschweig, 06 Jun. 6, 2008, https://graphics.tu-bs.de/upload/people/meyer/DA_Subframe_Alignment.pdf, 42 pages.

* cited by examiner

300

500

700

```
# Input folder path of videos
video_folder = "./"

# output folder for json files
json_output_folder = "./"

# List the input and output video files
iphone_video_list = ['iphone1.MOV', 'iphone2.MOV']
camera_video_list = ['camera1.MOV', 'camera2.MOV']

# Name the json files
output_json_list = ['output1.json', 'output2.json']

# Define the checkerboard
num_corners_x = 23 # Brandon's is 23; Albert's is 11
num_corners_y = 15 # Brandon's is 15; Albert's is 7
square_size = 35 # in unit of mm, Brandon's is 35mm; Albert's is 30mm sensor sizes
camera_sensor_size = 36 # in unit of mm
iphone_sensor_size = 36 # in unit of mm set motion threshold
motion_threshold = 0 # remove frames move too fast. The threshold is proportional to the motion speed.
```

| parameters | values |
| --- | --- |
| Camera focal length (mm) | (35.9, 35.9) |
| Camera principal point (pixels) | (965.7, 553.9) |
| iPhone focal length (mm) | (29.3, 29.3) |
| iPhone principle point (pixels) | (1923.6, 1116.4) |
| Translate vector (camera - iPhone) (mm) | (-10.3, -139.5, -704.0) |
| Rotation vector (degree) | (1.188, 0.401, -0.578) |
| image pairs used | 455 |
| Camera image size (pixels) | (1920, 1080) |
| Camera focal length (pixels) | (1912.2, 1914.5) |
| Camera Distortion coefficients | [[ 0.03576053 -0.06630428 0.00320336 0.00084893 0.1460476 ]] |
| iPhone image size (pixels) | (3840, 2160) |
| iPhone focal length (pixels) | (3125.6, 3124.0) |
| iPhone Distortion coefficients | [[ 0.21626798 -0.56111072 0.00466668 0.00202413 0.25987639]] |
| Rotation matrix (camera - iPhone) | [[ 0.99992472 0.01015364 0.00688964] [-0.01000857 0.99973411 -0.0207736 ] [-0.00709874 0.02070308 0.9997604711] |

JSON file ./json/output1.json has been created with the provided data structure.
Time taken: 2586.84915384783 seconds

RECEIVING A FIRST SET OF CANDIDATE FRAMES OF A PATTERN ~1102

RECEIVING A SECOND SET OF CANDIDATE FRAMES OF THE PATTERN ~1104

ANALYZING A MOTION OF THE PATTERN TO DETERMINE A TIME OFFSET ~1106

OUTPUTTING THE TIME OFFSET TO DETERMINE CAMERA PARAMETERS ~1108

SYSTEM AND METHODS FOR DETERMINING CAMERA PARAMETERS AND USES THEREOF

CROSS-REFERENCE TO RELATED APPLICATIONS

This application claims priority to U.S. Patent Application No. 63/549,794, filed on Feb. 5, 2024, and U.S. Patent Application No. 63/647,439, filed on May 14, 2024, the disclosures of which are incorporated here by reference.

FIELD OF THE DISCLOSURE

This disclosure relates generally to camera calibration, and more particularly, to a system and method for determining camera parameters for use in filming.

BACKGROUND OF THE DISCLOSURE

Camera calibration is a process used to determine intrinsic (internal) and extrinsic (external) parameters of a camera (video camera). To estimate parameters of the camera, a checkerboard is obtained with a pattern of contrasting squares (e.g., white and black squares). The pattern allows for detection of corner points (also known as corners), where contrasting squares meet, such as two black squares and two white squares. The camera is set up to capture images of the checkerboard from various angles, positions, and distances so that a camera's performance can be captured across an entire field of view (FOV) of the camera. The checkerboard can be tilted and/or rotated in different directions and fill at least partially a frame while the camera provides frames (or images). The images include the checkerboard in different parts of the frame, such as a center, corners, and/or edges. The images can be referred to as calibration images. The calibration images are then imported or provided to software used for estimating camera parameters. Example software can include camera calibration software, such as from Mathworks®. For example, a computer vision toolbox from Matlab® can be used as the camera calibration software. The camera calibration software can detect the corners of the checkerboard in each image. Each corner can be a reference point that has a known position in real-world space. Each corner on the checkerboard can have a three-dimensional (3D) coordinate (known as 3D point) in a world coordinate system (the real-world space). When the checkerboard is photographed from various angles and distances, the lens of the camera projects 3D points associated with the checkerboard onto a two-dimensional (2D) plane of a sensor of the camera to create a calibration image. A location of a corner in the calibration image has a 2D coordinate. The camera calibration software can estimate the intrinsic parameters of the camera based on the calibration images. The intrinsic parameters can include a focal length of the camera, an optical center (e.g., a principal point, and lens distortion coefficients. By analyzing how known 3D points (checkerboard corners) are mapped to corresponding 2D coordinates (2D points), the camera calibration software can infer (estimate) characteristics of this projection, including how much distortion is introduced by the lens.

The camera calibration software can also estimate the extrinsic parameters of the camera based on the calibration images. The extrinsic parameters can include a position and/or orientation of the camera relative to the checkerboard when each calibration image was generated. The extrinsic parameters can represent a rotation and translation of the camera relative to the checkerboard. For each captured calibration image, the camera calibration software uses the detected 2D points and corresponding 3D points to solve for a location of the camera and a viewing direction at a moment a respective calibration image was captured. After calibration, the camera calibration software can output a report of camera calibration results, including the estimated camera parameters.

SUMMARY OF THE DISCLOSURE

Various details of the present disclosure are hereinafter summarized to provide a basic understanding. This summary is not an extensive overview of the disclosure and is intended neither to identify certain elements of the disclosure, nor to delineate the scope thereof. Rather, the primary purpose of this summary is to present some concepts of the disclosure in a simplified form prior to the more detailed description that is presented hereinafter.

In an example, a method can include receiving a first set of candidate frames and a second set of candidate frames. The first set of candidate frames can be provided based on a first video of a pattern from a first camera. The second set of candidate frames can be provided based on a second video of the pattern from a second camera. The method can include analyzing a motion of the pattern across each of the first and second set of candidate frames to determine a time offset. The time offset can be indicative of a difference in recording time between corresponding frames from the first and second set of candidate frames that depict the pattern at a particular location. The method can include outputting the time offset to determine camera parameters of the first and second cameras based on the time offset.

In another example, a method can include receiving first and second videos from first and second cameras, respectively, of a pattern, selecting a first set of candidate frames from the first video based on a motion condition, selecting a second set of candidate frames from the second video based on the motion condition, computing a time offset based on a motion of the pattern in each of the first and second set of candidate frames, generating frame synchronization data to synchronize candidate frames from the first and second set of candidate frames based on the time offset, and computing camera parameters for the first and second cameras based on the frame synchronization data and the first and second set of candidate frames.

In yet another example, a method can include computing a time offset based on an analysis of a motion of a pattern in first and second set of candidate frames selected from respective video streams. The time offset can be indicative of a difference in recording time between corresponding frames from the first and second set of candidate frames that depict the pattern at a particular location. The method can include generating frame synchronization data to synchronize candidate frames from the first and second set of candidate frames based on the time offset, computing camera parameters based on the frame synchronization data and the first and second set of candidate frames, generating a depth map for a scene based on the camera parameters and video footage of a scene from first and second cameras, and generating augmented video data comprising a main video footage of the scene that has been modified with a digital asset based on the depth map.

In another example, a method can include computing a time offset based on an analysis of a motion of a pattern in first and second set of candidate frames selected from corresponding first and second video streams. The time offset can be indicative of a difference in recording time between corresponding frames from the first and second set of candidate frames that depict the pattern at a particular location. The first video stream can be provided by a first camera and the second video stream can be provided by a portable device. The method can further include generating frame synchronization data to synchronize candidate frames from the first and second set of candidate frames based on the time offset, and computing camera parameters for at least the first camera based on the frame synchronization data and the first and second set of candidate frames.

BRIEF DESCRIPTION OF THE DRAWINGS

Embodiments are described with reference to the accompanying drawings. In the drawings, like reference numbers can indicate identical or functionally similar elements. The drawing in which an element first appears is generally indicated by the left-most digit in the corresponding reference number.

FIG. 7 is an example of a portion of pseudocode.

FIG. 8 is an example of a camera parameter report.

DETAILED DESCRIPTION

Figure 1:
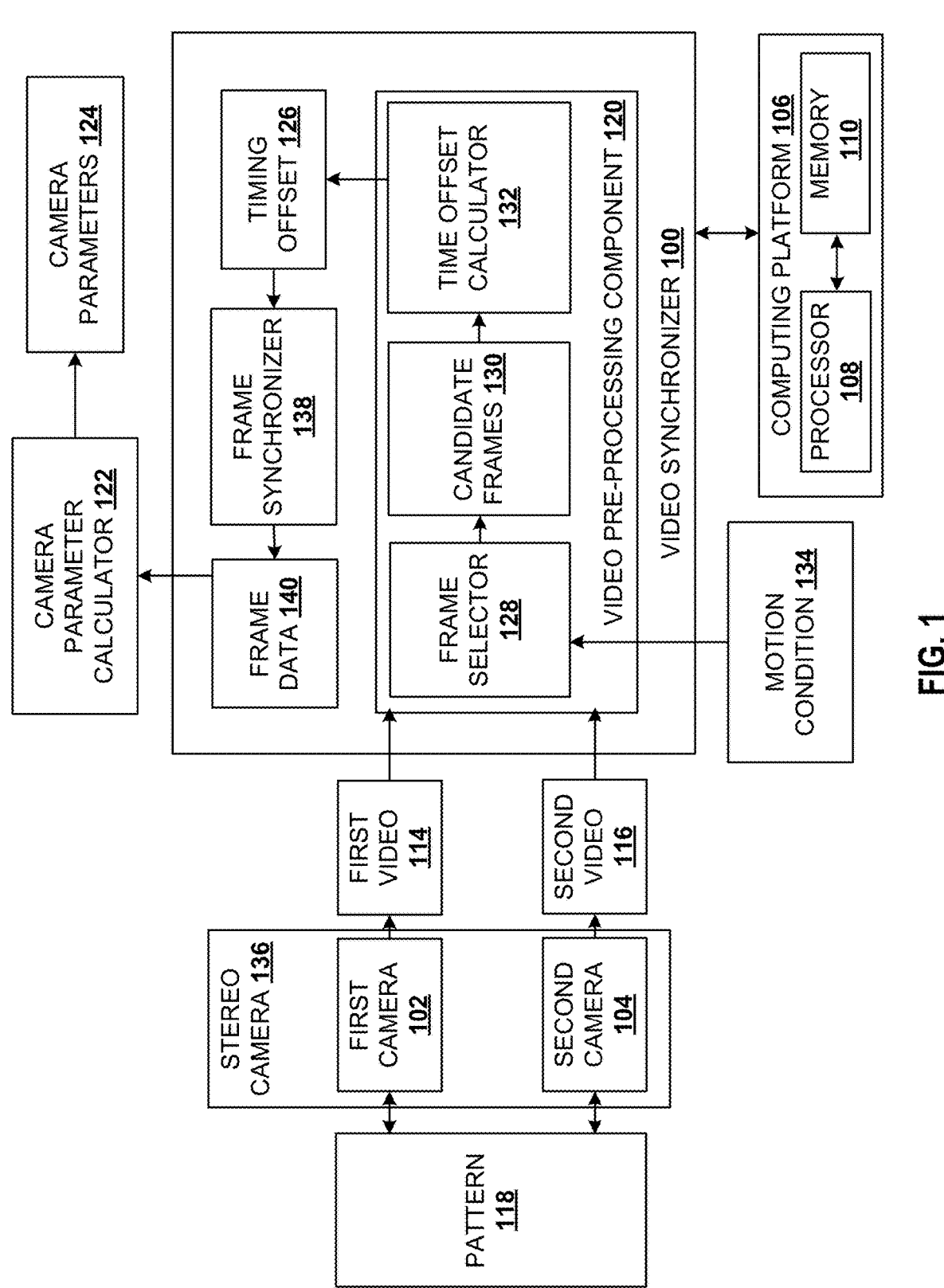
FIG. 1 a block diagram of a video synchronizer.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

One or more aspects of the present disclosure relate to determining camera parameters. Examples are disclosed herein in which camera parameters are determined for a stereo camera for filming applications. In other examples, the system and methods, as disclosed herein, can be used for calibration of cameras outside of film production. Filming applications can include, but not limited to, movie production, television (TV) show production, news film production, sports production, or any type of visual storytelling or broadcasting that uses visual effects (VFX), such as computer generated imagery (CGI), known as digital assets. Example digital assets can include, but not limited to, three-dimensional (3D) models of objects, characters, and/or environment, textures applied to 3D models, digital animations that involve movement of the 3D models, visual effects, etc.

Stereo cameras are used in filming to allow for realistic integration of digital assets (e.g., computer generated imagery (CGI) elements or assets) into real-world footage. Before filming of the scene, a stereo calibration process is implemented to determine both the intrinsic and extrinsic properties of the stereo camera. During this process, two cameras (collectively referred to as a stereo camera) are positioned side by side to mimic human binocular vision to allow filmmakers to capture a scene with a depth perspective similar to that would be perceived by human eyes. The stereo cameras can capture a same scene from slightly different angles, providing two sets of frames (or images) that mimic corresponding left and right eye views of a human. A depth map is generated using the two sets of frames. A depth map is a digital image or data representation with information relating to a distance between surfaces of scene objects from a viewpoint of a camera. Each pixel in the depth map can correspond to a point in the scene and carries a value that represents how far away that point is from the camera. The depth map can be a grayscale image where an intensity of each pixel indicates a relative distance of a corresponding point in the scene relative to the cameras. Thus, the depth map encodes depth information of a scene in a two-dimensional (2D) format. The depth map can be generated based on a principle of binocular disparity, that is, based on a difference in the two sets of frames seen by the cameras to calculate the distance of objects from the cameras. Disparity refers to a difference in horizontal positions of a feature as seen in frames. Objects closer to the cameras have higher disparity, while distant objects have lower disparity.

Depth maps are used in many applications, such as in three-dimensional (3D) reconstruction, virtual reality (VR), and augmented reality (AR). In the context of filming, depth maps are used to control placement of digital assets into real-world footage so that the digital assets appear realistic and interact appropriately with real-world elements. Depth maps are used in augmentation (modification) of the real-world footage to enhance or include digital assets in the footage, by managing a scale, occlusion, and/or spatial relationships of the digital asset. Because depth maps are generated based on frames (or images) from the stereo cameras, depth map accuracy is a function of both intrinsic and extrinsic camera parameters. Inaccuracies in the depth map can significantly affect the digital assets' integration, influencing their placement, simulation of lighting and shadows, interaction with the environment, perspective and scale, motion tracking, camera movement, etc., This, in turn, can lead to various undesirable effects that detract from the realism of the augmented video. For example, if a CGI bear is supposed to interact with an object in the scene (e.g., knock over a vase), a depth and spatial relationship between the CGI bear and the vase needs to be accurate for the animation to look convincing. If the depth map lacks accuracy, a CGI bear's interaction with the vase can appear disconnected. For instance, the CGI bear can seem to push the vase without making contact or, conversely, intersect unnaturally with the vase or other parts of the environment. Thus, calibration of stereo cameras prior to filming (known as stereo camera calibration) is needed for accurate integration of digital assets, such as a CGI bear, into real-world footage.

To determine camera parameters of the stereo camera, images (frames) from each camera (or image sensor) are taken at about a same time to capture a checkerboard from slightly different perspectives. To ensure that the images are captured at precisely the same moment the images are synchronized. Currently, manual synchronization is used to align images through manual selection and mapping of images from corresponding cameras to each other to provide image pairs. Images captured at precisely (or at about a same moment in time) of the scene from two different viewpoints are associated or linked to form an image-pair. For example, after recording, videos from the stereo camera are imported into video editing software. A user then manually scrubs through the videos to select frames where the checkerboard is clearly visible and properly positioned for calibration. The selected frames are then manually synchronized to ensure that the selected frames represent a same moment in time from each camera's perspective to provide synchronized frames. Because the synchronization process is manual it is susceptible to inaccuracies. These inaccuracies can arise from a subjective selection and alignment of frames by the user, potentially leading to misalignment of the image pairs. Such misalignments can subsequently affect a precision with which camera calibration software calculates the camera parameters. After stereo calibration, each camera has been characterized in terms of its own intrinsic parameters, and the spatial relationship between the two cameras is known.

The currently used synchronization technique in film production for stereo camera calibration requires an extensive amount of time and is subjective as the user has to manually go through images to provide the image-pairs for camera parameter determination. In stereo camera setups that use cameras equipped with zoom lenses, which are lenses that have a variable focal length, exacerbates the time needed to prepare the image-pairs. Each focal length setting on a zoom lens can alter an image's perspective, distortion, and/or FOV.

For example, for a 22 to 90 millimeter (mm) zoom lens, there can be six stops, specific focal lengths within a 22 mm to 90 mm range for which image-pairs are needed so camera parameters can be computed for these stops. Calibration of a camera using the 22 to 90 mm zoom lens at all six marked stops can take upwards of ten hours to complete a calibration process for just a single lens. Therefore, when using zoom lenses in stereo camera setups, each camera must be calibrated separately for each focal length used so that the camera parameters are accurately accounted for at each lens setting (or camera setting). For stereo imaging to work effectively, both cameras in the setup need to have matched perspectives and focal lengths at any given time. This means if one camera zooms in or out, the other camera must match this change to maintain correct stereo geometry. Discrepancies in focal lengths or perspectives can lead to inaccurate depth information (depth map) and consequently impact a realism and accuracy of CGI generated video footage (the augmented video data).

Examples are disclosed herein for estimating camera parameters of stereo cameras used in filming based on a more efficient image (frame) synchronization technique. By incorporating the frame synchronization technique, as disclosed herein, into a stereo camera calibration process (rather than using existing synchronization approaches)

reduces an amount of time required for image-pair generation as well as reduces image-pair misalignment, which can impact a precision with which camera calibration software calculates camera parameters. With accurate camera parameters, depth information (depth maps) can be provided with minimal to low inaccuracies leading to more realistic integration of digital assets into real-world footage.

Video Synchronizer

FIG. 1 a block diagram of a video synchronizer 100 that can be used for estimating camera parameters 124, such as intrinsic and/or extrinsic parameters, of a stereo camera 136. The stereo camera 136 can include two or more cameras (or image sensor and lens components) that work in tandem to produce separate video feeds or images. The stereo camera 136 includes first and second cameras 102-104 to provide first and second videos 114-116, respectively. In other examples, the stereo camera 136 can include separate image sensor and lens components that work to provide the first and second videos 114-116, respectively. In some examples, one or more of the first and second cameras 102-104 can be a component of another device, such as a portable device. The portable device can include, but not limited to, a mobile phone, a tablet, a personal digital assistant (PDA), etc. Thus, in some examples, the first camera 102 is of the mobile phone, whereas the second camera 104 is a digital cinema camera.

The video synchronizer 100 can be implemented using one or more modules, shown in block form in the drawings. The one or more modules can be in software or hardware form, or a combination thereof. In some examples, the video synchronizer 100 can be implemented as machine readable instructions for execution on one or more computing platforms 106, as shown in FIG. 1. The computing platform 106 can include one or more computing devices selected from, for example, a desktop computer, a server, a controller, a blade, a mobile phone, a tablet, a laptop, a PDA, and the like. The computing platform 106 can include a processor 108 and a memory 110. By way of example, the memory 110 can be implemented as a non-transitory computer storage medium, such as volatile memory (e.g., random access memory), non-volatile memory (e.g., a hard disk drive, a solid-state drive, a flash memory, or the like), or a combination thereof. The processor 108 can be implemented, for example, as one or more processor cores. The memory 110 can store machine-readable instructions that can be retrieved and executed by the processor 108 to implement the video synchronizer 100, such as in embodiments in which the video synchronizer 100 is implemented as software, application, tool, or a plug-in for another application. Each of the processor 108 and the memory 110 can be implemented on a similar or a different computing platform. The computing platform 106 can be implemented in a cloud computing environment (for example, as disclosed herein) and thus on a cloud infrastructure. In such a situation, features of the computing platform 106 can be representative of a single instance of hardware or multiple instances of hardware executing across the multiple of instances (e.g., distributed) of hardware (e.g., computers, routers, memory, processors, or a combination thereof). Alternatively, the computing platform 106 can be implemented on a single dedicated server or workstation.

Stereo Camera Calibration

The first and second cameras 102-104 can provide first and second videos 112-114, respectively, based on a pattern 118. The pattern 118 can be placed in a FOV of the first and second cameras 102-104, which can be slightly offset to capture the pattern 118 at a different perspective. In some examples, the pattern 118 is a checkerboard, in other examples, a different pattern can be used. The pattern 118 can be placed at different distances and/or orientations by a subject relative to the cameras 102-104. An exact geometry of an object, design, or feature (e.g., square) in the pattern 118 can be known. The cameras 102-104 can capture frames (images) of the pattern 118 for a period of time as the pattern 118 is placed at different distances and/orientations relative to the cameras 102-104 to provide the first and second videos 112-114, respectively. The subject can periodically pause and pose (e.g., for about two seconds, or a different amount of time) with the pattern 118 toward the first and second cameras 102-104. The pause and pose ensures that the pattern 118 is relatively still (has little motion), which facilitates easier selection of frames for camera parameter calculation, as disclosed herein.

The video synchronizer 100 receives the first and second videos 112-114. In some examples, the first and second videos 112-114 are stored in the memory 110 and the video synchronizer 100 retrieves the first and second videos 112-114 from the memory 110 (in other instances from a portable memory device, such as a memory card, or from each portable device). The video synchronizer 100 includes a video pre-processing component 120 that provides a time offset 126 for use in candidate frame synchronization. The camera parameters 124 can include extrinsic and/or intrinsic parameters of the first and second cameras 102-104, respectively. The video pre-processing component 120 can compute a time offset 126 for synchronizing candidate frames for generation of the camera parameters 124, as disclosed herein.

The video pre-processing component 120 includes a frame selector 128. The frame selector 128 can receive (or retrieve from the memory 110) the first and second videos 114-116. The first and second videos 114-116 can be composed of frames (video frames), which can depict the pattern 118. Each frame of the first and second videos 114-116 can be identified by a frame number and can have an associated frame timestamp (e.g., a time at which the frame was captured). The timestamp can be as an example a Society of Motion Picture and Television Engineers (SMPTE) timecode. The frame selector 128 can analyze each of the first and second videos 114-116 to select (e.g., identify) candidate frames 130 where motion is minimal, making these frames (e.g., frames) suitable for downstream camera parameter determination. The frame selector 128 can provide to a time offset calculator 132 the candidate frames 130 or provide candidate frame identification data identifying which frames are the candidate frames 130 (e.g., by a frame number). The frame selector 128 can select a subset of frames from each of the first and second videos 114-116 where a change in a position of the pattern (captured by the first and second videos 114-116) is minimal to provide the candidate frames 130.

For example, the frame selector 128 can select a pair of frames (consecutive frames) from the first video 114 and a pair of frames from the second video 116. For each pair of consecutive frames, pixel values (e.g., brightness, color, etc.) of one frame are subtracted from pixel values of a next frame. The result of the subtraction can indicate areas of change, which correspond to motion. The frame selector 128 can take absolute values of the differences so that all changes contribute positively to a motion metric, regardless of a direction of the change. After obtaining the absolute differences, the frame selector 128 can sum these values across an entire frame to provide a single value that represents the amount of motion between the two frames, that can be referred to as a motion metric. A motion metric is computed for each pair of frames. An elevated motion metric can indicate a high degree of changes between frames (e.g., high motion), while a low motion metric suggests minimal changes (e.g., low or no motion) between the frames. Accordingly, the motion metric can be indicative of an amount of motion between subsequent frames (e.g., an amount of change in the position of the pattern 118).

The frame selector 128 can evaluate (e.g., compare) the motion metric for each pair of frames based on a motion condition 134 to determine whether the motion metric satisfies or does not satisfy the motion condition 134 to identify or provide the candidate frames 130. The motion condition 134 can be indicative of a condition of low or no motion between frame pairs, or frames with motion that is to fast. Low motion or no motion between frames pairs (subsequent frames) can refer to a change in the position of the pattern 118 (in video (the first and second videos 114-116) that is minimal or zero. Fast motion refers to the change in the position of the pattern 118 in video that exceeds the motion threshold. In some examples, the motion condition 134 is a motion threshold.

Figure 2:
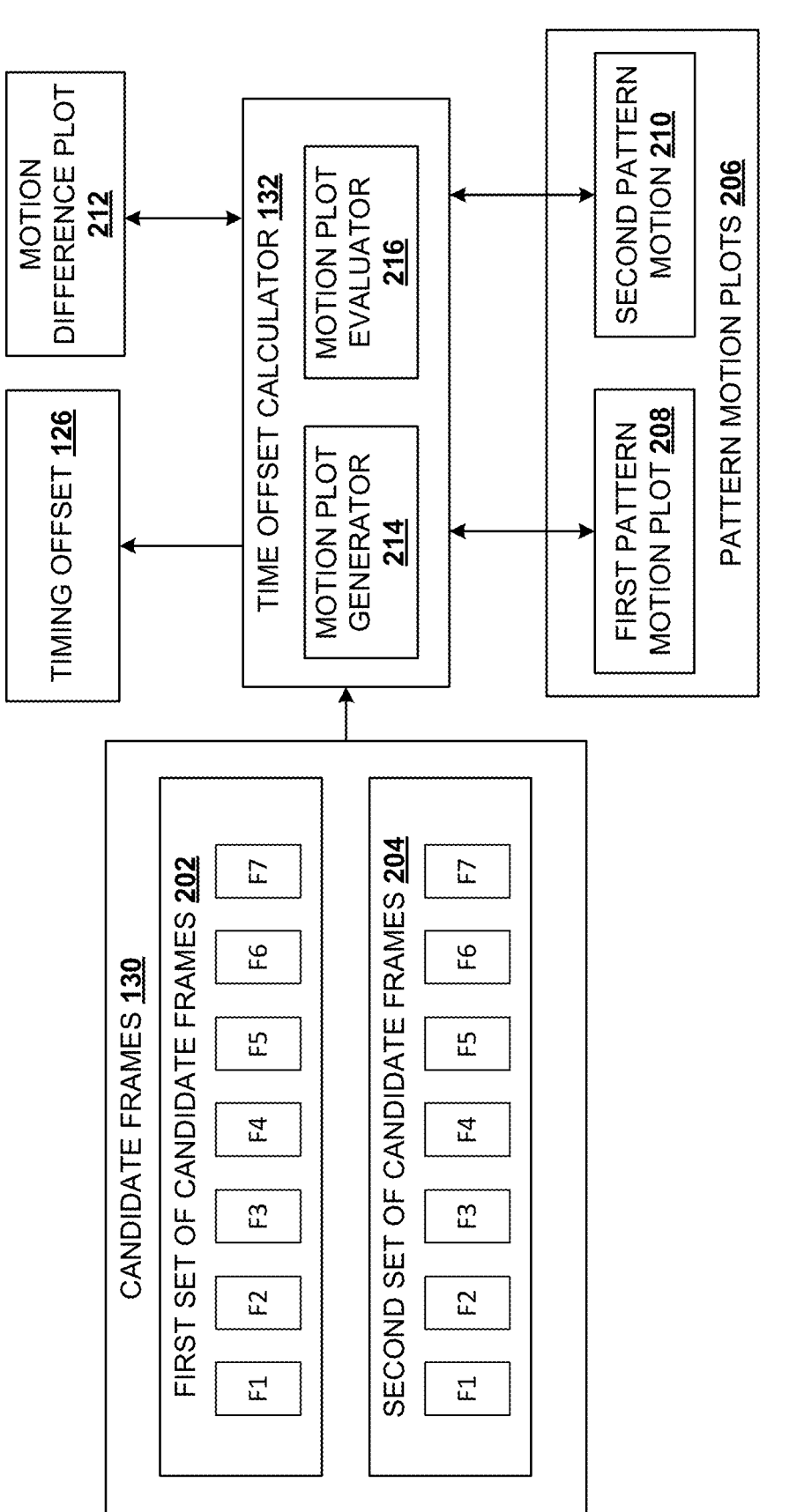
FIG. 2 is an example of a block diagram of a time offset calculator.

For example, the frame selector 128 can determine whether the motion metric is below or less than the motion threshold to identify or provide the candidate frames 130. The frame selector 128 can select (e.g., identify) a subsequent frame from each pair of frames of the first and second videos 114-116 as a candidate frame in response to determining that the motion metric for that pair of frames is below or less than the motion threshold (or satisfies or does not satisfy the motion condition 134). Thus, if the motion metric between two frames (e.g., first and second frames) is below the motion threshold, the second frame can be selected by the frame selector 128 to provide a candidate frame. Accordingly, the candidate frames 130 can include a first set candidate frames 202 selected from the first video 114 and a second set candidate frames 204 from the second video 116 that depicts the pattern 118, as shown in FIG. 2. FIG. 2 an example of a block diagram of the time offset calculator 132, as shown in FIG. 1. Thus, reference can be made to one or more examples of FIG. 2 in the example of FIG. 1. As shown in the example of FIG. 2, each of the first and second set of candidate frames 202-204 include respective candidate frames (e.g., identified as frames "F1-F7"). Each of the first and second set of candidate frames 202-204 can include a similar and/or a different number of candidate frames.

The candidate frames 130 or data identifying the candidate frames 130 can be provided to the time offset calculator 132. The time offset calculator 132 can compute the time offset 126 for synchronization of the candidate frames 130. The candidate frames 130 can be synchronized by a frame synchronizer 138. The frame synchronizer 138 can associate a candidate frame from the first set of candidate frames 202 with a corresponding candidate frame from the second second of candidate frames 204 based on the time offset 126 to provide frame synchronization data 140. The frame synchronization data 140 can be processed by the camera parameter calculator 122 to provide the camera parameters 124.

For example, the time offset calculator 132 can employ one or more computer vision algorithms to detect the pattern 118 in the candidate frames 130. For example, the time offset calculator 132 can identify a checkerboard corner or an entire pattern itself in each candidate frame in which the pattern 118 is present. The time offset calculator 132 can use the one or more computer vision algorithms (e.g., such as those found in OpenCV or similar libraries) to identify corners of the pattern 118 (e.g., checkerboard) in each candidate frame in which the pattern 118 is present. Once the corners of the pattern 118 have been detected in the candidate frame, the time offset calculator 132 can compute a pattern motion feature for the pattern 118 using the detected corners. The pattern motion feature can be a centroid of the pattern 118 in the candidate frame, or a unique descriptor based on an arrangement of corners of the pattern 118 in the candidate frame.

For example, the time offset calculator 132 can calculate the centroid (e.g., a geometric center) of the pattern 118 by averaging positions of the detected corners to provide a single average value that represents a position (e.g., X, Y, and Z coordinates; the centroid) of the pattern 118 in the candidate frame. The time offset calculator 132 can track the position of the pattern 118 across the candidate frames 130. Using the tracked position of the pattern 118, the time offset calculator 132 can employ a motion plot generator 214 to plot the position of the pattern 118 (e.g., the centroid) over time or frame number to provide pattern motion plots 206, as shown in FIG. 2. The pattern motion plots 206 characterize the movement (motion) of the pattern 118 across the candidate frames 130 depicting the pattern 118. The time offset calculator 132 can provide a first pattern motion plot 208 for the pattern 118 depicted in the first set of candidate frames 202 and a second pattern motion plot 210 for the pattern 118 depicted in the second set of candidate frames 204. Each of the first and second pattern motion plots 206-208 can characterize the position of the pattern 118 over time or with respect to frame numbers. Thus, the changing position of the pattern 118 can be representative of a motion (e.g., in a given dimension, such as x-dimension, y-dimension, and z-dimension) of the pattern 118 across each set of candidate frames 202-204. Accordingly, the time offset calculator 132 can generate the first pattern motion plot 208 characterizing the tracked motion of the pattern 118 across the first set of candidate frames 202, and the second pattern motion plot 210 characterizing the tracked motion of the pattern 118 across the second set of candidate frames 204.

Figure 3:
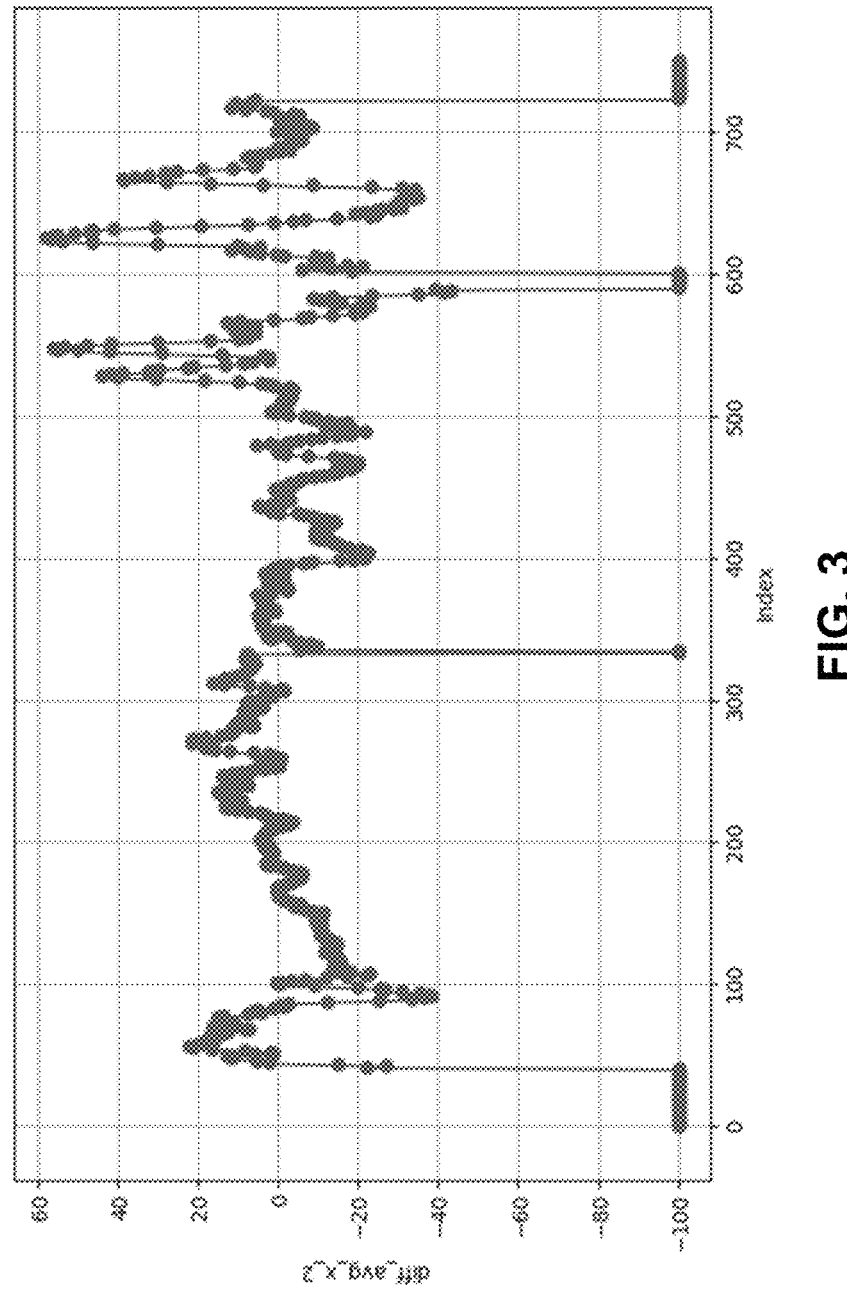
FIG. 3 is an example of a pattern motion plot.
Figure 4:
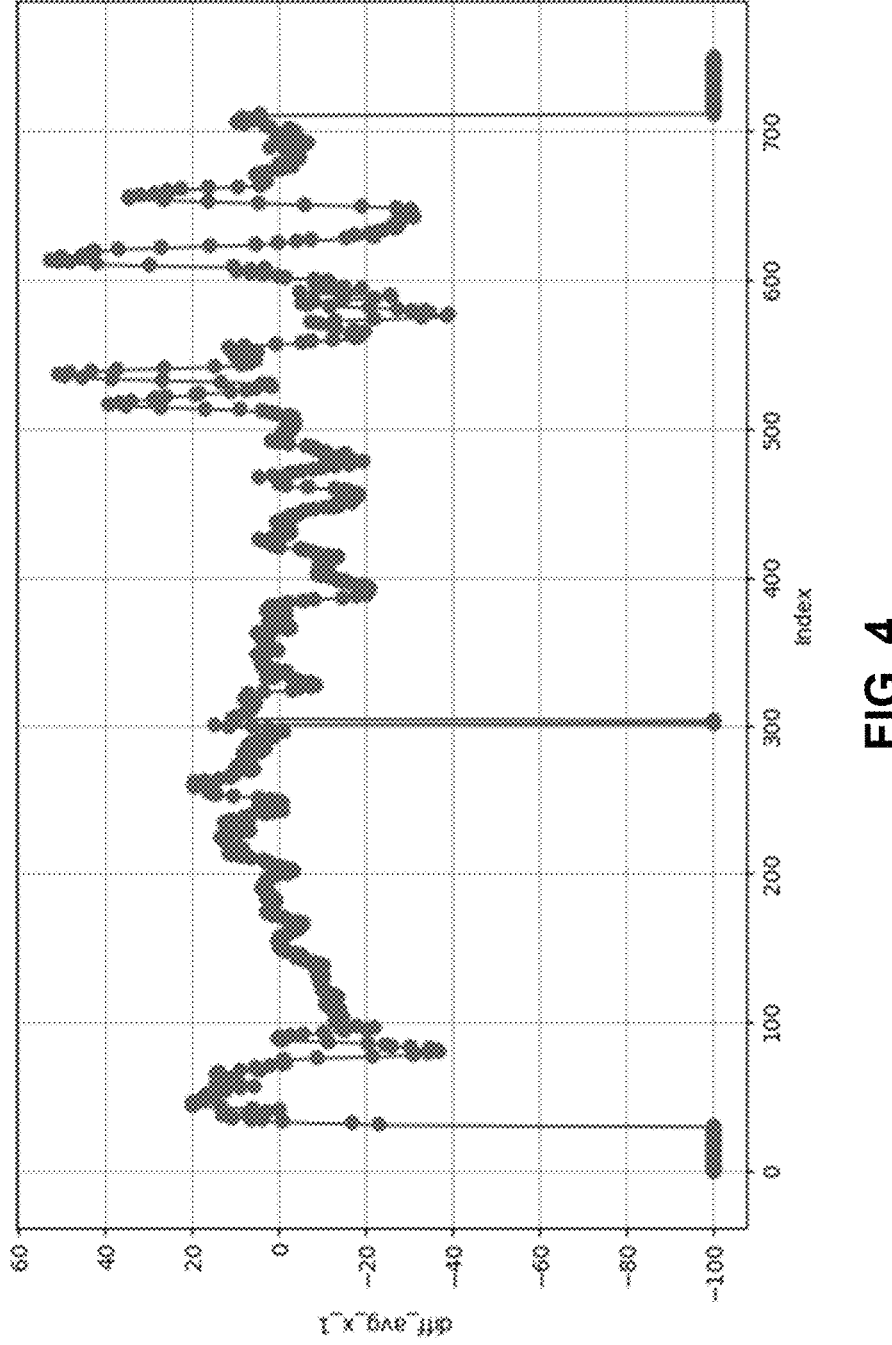
FIG. 4 is an example of another pattern motion plot.

FIGS. 3-4 are examples of pattern motion plots 300-400 that can be provided by the time offset calculator 132. In some examples, the pattern motion plot 300 is the first pattern motion plot 208 and the pattern motion plot 400 is the second pattern motion plot 210, as shown in FIG. 2. Thus, reference can be made to one or more examples of FIGS. 1-2 in the examples of FIGS. 3-4. For example, the first and second pattern motion plots 206-208 (or the pattern plots 300-400) include an x-axis that is representative of candidate frame index values (e.g., frame numbers) and a y-axis that is representative of a position (e.g., the average position) of the pattern 118 depicted in corresponding candidate frames. The time offset calculator 132 can provide the first and second pattern motion plots 206-208 in one or more dimensions. The time offset calculator 132 can track the pattern 118 in the one or more dimensions (e.g., horizontal and vertical dimension) across the one of the first and second set of candidate frames 202-204. The time offset calculator 132, in some instances, can generate separate pattern motion plots or a combined motion plot. The combined motion plot can be generated by combining a pattern motion plot for a horizontal dimension and a pattern motion plot for a vertical dimension to provide the combined motion plot. The time offset calculator 132 can determine the time offset 126 using the combined motion plot.

The time offset calculator 132 can analyze a motion of the pattern 118 across each of the first and second set of candidate frames 202-204 to determine the time offset 126. The time offset 126 is a quantitative measure of a difference in recording time between two corresponding frames from the first and second set of candidate frames 204-206 that depict the pattern 118 at a particular location but captured at distinct moments in time. Time offset can be expressed in units of time (such as seconds or milliseconds) or as a count of frames (e.g., if a frame rate is known). Ideally, the motion pattern of the pattern 118 across each of one of the first and second set of candidate frames 202-204 should be similar, reflecting the pattern's consistent movement in the scene as captured from two slightly different perspectives.

Due to differences in frame rates or slight variances in start times of recording (e.g., hitting the "record" button), the first and second cameras 102-104 provide frames that may not align temporally. This discrepancy means that when the pattern 118 is located with a respective FOV at the particular location, each camera records the pattern 118 at distinct moments. For instance, frame 10 from the first camera 102 and frame 42 from the second camera 104 both capture the pattern 118 at a particular position within the scene, but these frames are recorded at different times. Thus, the first and second videos 114-116 produced by the first and second cameras 102-104, respectively, are not synchronized in time. This means a frame chosen from the second video 116 may not correspond to the same moment in time or depict the pattern 118 in the same location as a similarly chosen frame from the first video 114. To determine the time offset 126 between the first and second set of candidate frames 202-204, the time offset calculator 132 can employ a motion plot evaluator 216 to compare the first and second pattern motion plots 206-208 to compute a pattern motion difference plot 212. For example, the time offset calculator 132 can overlay the first pattern motion plot 208 over the second pattern motion plot 210 to determine the pattern motion difference plot 212.

For example, the motion plot evaluator 216 can compare a respective position plot value and its associated or assigned frame index value in each of the first and second pattern motion plots 208-210 to determine a position difference value. The position difference value can be representative of a position (location) difference of the pattern 118 in the respective candidate frames of the first and second candidate frames 202-204. The motion plot evaluator 216 can compute position difference values between position plot values from the first and second pattern motion plots 208-210. The computed position difference values can be normalized to provide normalized position difference values. The motion plot evaluator 216 can also compute candidate frame index offset values using candidate frame index values (frame numbers) assigned to (or associated with) the position plot values. The motion plot evaluator 216 can use the normalized position difference values and the computed candidate frame index offset values to construct the pattern motion difference plot 212. For example, frame 10 of the first set of candidate frames 202 can depict the pattern 118 at the particular location at a first distinct moment in time, and frame 42 of the second set of candidate frames 204 can depict the pattern 118 at the particular location at a second distinct moment in time.

Figure 5:
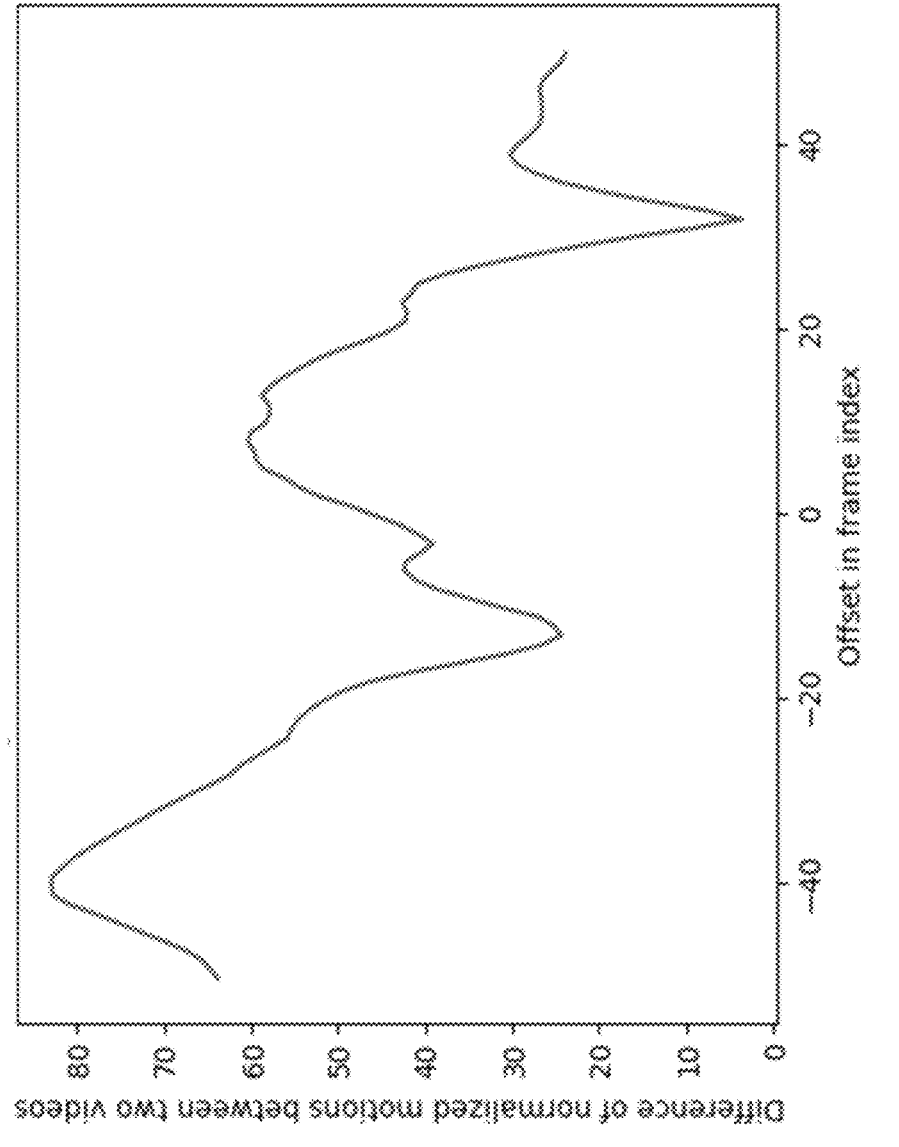
FIG. 5 is an example of a pattern motion difference plot.

FIG. 5 is an example of a pattern motion difference plot 500. The pattern motion difference plot 500 can correspond to the pattern motion difference plot 212, as shown in FIG. 2. Thus, reference can be made to one or more examples of FIGS. 1-4 in the example of FIG. 5. For example, the pattern motion difference plot 500 (or the pattern motion difference plot 212) include an x-axis that is representative of a candidate frame index offset and a y-axis that is representative of a normalized position difference between the first and second videos 114-116 (the first and second candidate frames 202-204 in which the pattern 118 is present). Each plot value in the pattern motion difference plot 212 (or 500) represents a normalized position (location) difference value relative to a candidate frame index offset value. The time offset calculator 132 can use the pattern motion difference plot 212 to provide the time offset 126 for synchronizing the candidate frames 130. For example, the time offset calculator 132 can determine that the time offset 126 between respective candidate frames from the first and second set of candidate frames 202-204 is about 32 frames. Each data point in the pattern motion difference plot 500 is showing a location difference of a given frame compared with a previous frame, e.g., it shows that it moves right by x pixels between two frames. The "location" measured is an average location of all the corners of the checkerboard. The two videos can be recording a same motion of a same pattern and thus a same movement pattern is seen in these two videos. But, because the "record" buttons on the recording devices are pressed at different times a time difference is found to be able to pair up the image between two videos. If two devices record with the same rate, e.g., 24 frames per second, the offset can be a constant.

The frame synchronizer 138 can use the time offset 126 to match (associate) a candidate frame from the first set of candidate frames 202 to a corresponding frame from the second set of candidate frames 202 depicting the pattern 118 in a same location to provide the frame synchronization data 140. In some instances, the frame synchronizer 138 can organize or group the candidate frames 130 into frame pairs based on the frame synchronization data 140 and provide the frame pairs to the camera parameter calculator to compute the camera parameters 124 for the stereo camera 136. The frame synchronizer 138 can store the frame pairs in the memory 110 or different memory that can be accessed by the camera parameter calculator 122. Thus, the frame synchronizer 138 can synchronize respective candidate frames from the first and second set of candidate frames 202-204 to provide the frame pairs. The frame synchronizer 138 can output the frame synchronization data 140 identifying each candidate frame from the first set of candidate frames 202 depicting the pattern 118 at the particular location that is associated with (e.g., logically linked) with a corresponding candidate frame from the second set of candidate frames 202 depicting the pattern 118 at the same particular location. The camera parameter calculator 122 can compute the camera parameters 124 for the stereo camera 136 using the frame synchronization data 140 and the candidate frames 130.

Accordingly, by using the video synchronizer 100 in stereo camera calibration of the stereo camera 136 reduces an amount of time required for image-pair generation as well as reduces image-pair misalignment, an issue of existing frame synchronization techniques, which can impact a precision with which camera calibration software calculates camera parameters. A stereo camera calibration technique implemented using the video synchronizer can provide accurate camera parameters and can lead to more accurate depth maps.

by incorporating the frame synchronization technique, as disclosed herein, into a stereo camera calibration process (rather than using existing synchronization approaches) reduces an amount of time required for image-pair generation as well as reduces image-pair misalignment, which can impact a precision with which camera calibration software calculates camera parameters. With accurate camera parameters, depth information (depth maps) can be provided with minimal to low inaccuracies leading to more realistic integration of digital assets into real-world footage.

System for Providing Augmented Video

Figure 6:
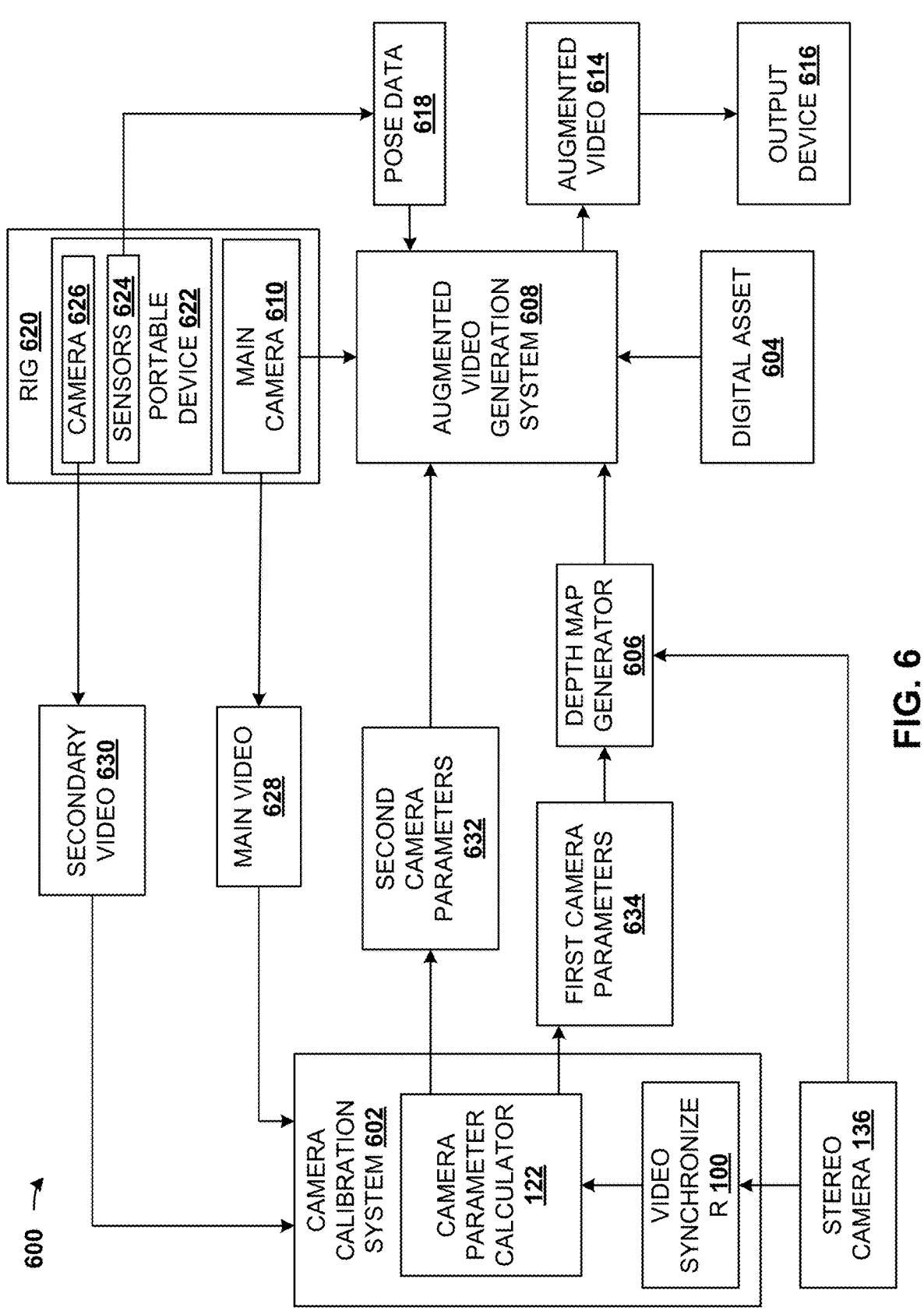
FIG. 6 is a block diagram of a system for generating augmented video.

FIG. 6 is a block diagram of an example of a system 600 for providing augmented video 614, such as during filming (or film production) of a scene. For example, the augmented video 614 can be provided during CGI (VFX) filming. During CGI filming, it is desirable to know a location and/or behavior (movements) of a CGI asset and other elements relative to each other in the scene. That is, during production, a director or producer may want to know the position and/or location of the CGI asset so that other elements (e.g., actors, props, etc.), or the CGI asset itself, can be adjusted to create a seamless integration of the two. For example, the director may want the CGI asset to move and behave in a way that is consistent with live-action footage. Knowledge of where the CGI asset is to be located and how the CGI asset will behave is important for the director during filming (e.g., production) as it can minimize retakes, as well as reduce post-production time and costs. For example, knowledge of how the CGI asset is to behave in a scene can help the director adjust a position or behavior of an actor relative to the CGI asset. Generally, to help actors know where to look and how to interact with the CGI asset, filmmakers often use visual cues on set, such as reference objects, markers, targets, verbal cues, and in some instances, show the actor a pre-visualization of the scene. Pre-visualization (or "pre-viz"), is a technique, used in filmmaking to create a rough, animated version of a final sequence that gives the actor an estimate of what the CGI asset will look like, where it will be positioned, and how it will behave before the scene filmed.

For example, the director can use a previsualization system that has been configured to provide a composited video feed with an embedded CGI asset therein while the scene is being filmed. One example of such a device/system is described in U.S. patent application Ser. No. 17/410,479, and entitled "Previsualization Devices and Systems for the Film Industry," filed Aug. 24, 2021, which is incorporated herein by reference in its entirety. In some examples, the augmented video generation system 608 is a previsualization system. The previsualization system allows the director to have a "good enough" shot of the scene with the CGI asset so that production issues (e.g., where the actor should actually be looking, where the CGI asset should be located, how the CGI asset should behave, etc.) can be corrected during filming and thus at a production stage. The previsualization system can implement digital compositing to provide composited frames with the CGI asset embedded therein.

During digital compositing, movements of the CGI asset can be synchronized with video footage in a film or video so that when the composited frames are played back on a display the movements of the CGI asset are coordinated with movements of the live-action footage. Previsualization systems can be configured to provide for CGI asset-live-action footage synchronization. For example, the previsualization system can implement composition techniques/operations to combine different elements, such as live-action footage, the CGI asset, CGI asset movements, other special effects, into augmented video data (one or more composited frames). The augmented video data can be rendered on the display and visualized by a user (e.g., the director).

In some examples, the system 600 can include a camera calibration system 602, which includes the video synchronizer 100 and the camera parameter calculator 122, as shown in FIG. 1. The camera calibration system 602 can be implemented on a computing platform, such as the computing platform 106, as shown in FIG. 1. Thus, reference can be made to one or more examples of FIGS. 1-5 in the example of FIG. 6. The camera calibration system 602 can be configured to compute first camera parameters 634 for the stereo camera 136 according to one or more examples, as disclosed herein. In some examples, the first camera parameters 634 correspond to the camera parameters 124, as shown in FIG. 1. The system 600 includes a depth map generator 606 that can receive respective video streams of the scene. The depth map generator 606 can use the camera parameters 124 and the video streams from the stereo camera 136 to extract depth information from the scene to create a depth map of the scene.

The system 600 further includes an augmented video generation system 608 that can be used to provide the augmented video 614 based on the depth map, a digital asset 604 and main video footage (real-world footage) of the scene from a main camera 610, and in some instances based on pose data 618. The main camera 610 in context of film and video production is used to capture the scene from a given viewpoint (e.g., primary viewpoint), which is a perspective intended for an audience. This main camera 610 is often placed in an optimal position to capture a desired framing, composition, and cinematic quality of a shot. The main camera 610 can be positioned based on a director's vision and cinematographer's plan that best tell a story, focusing on lighting, composition, and movement that enhance a narrative. The main camera 610 can be a single-lens camera and in some instances can be referred to as a main footage camera.

In some examples, the augmented video generation system 608 can use the depth map to augment the main video footage with the digital asset 604 (e.g., CGI asset, for example, a CGI bear) to provide the augmented video 614. Thus, the depth information obtained from the stereo camera 136 is then used with the main video footage captured by the main camera 610 to accurately integrate the digital asset 604 into the scene. The depth map allows for precise placement of the digital asset 604 within the scene so that the main video footage of the scene and the digital asset 604 interact correctly with real-world elements in terms of scale, occlusion (how objects block each other), and spatial relationships. The augmented video 614 can be outputted on an output device 612. The output device 612 can include one or more stationary displays (e.g., televisions, monitors, etc.), viewfinders, one or more displays of portable or stationary devices, and/or the like.

In some examples, the main camera 610 is secured or coupled to a rig 620, in some instances, known as a camera rig. The rig 620 can be a handheld rig, a gimbal, dolly and track system, jib or crane rig, steadicam rig, or a drone rig. A type of rig can be based on requirements of the scene, for example, desired camera movement, an environment, an effect a filmmaker wants to achieve. A portable device 622 can be secured to the rig 620. In some examples, the portable device 622 is a mobile phone, such as an iPhone®, or a different type of portable phone. The portable device 622 can provide pose data 618 based on sensor measurements from one or more sensors 624 of the portable device 622 and one or more cameras, such as the camera 626 of the portable device 622. The one or more sensors 624 can include one or more, but not limited to, a Global Positioning System (GPS) receiver, light detection and ranging (LIDAR), an accelerometer, a gyroscope, magnetometer, and an inertial measurement unit (IMU).

The pose data 618 can indicate a location (position) and orientation of the portable device 622 in 3D space. Because an orientation and/or location of the portable device 622 relative to the main camera 610 is fixed and thus known, the pose data 612 of the portable device 622 can be used for estimating a pose data of the main camera 610 (e.g., an estimate relative location and orientation of the main camera 610).

In some examples, the portable device 622 includes a camera 626, which can be referred to as a secondary camera 626. The secondary camera 626 can be a phone camera. In some instances, for example, before shooting or filming of the scene, camera parameters of the camera 626 and the main camera 610 can be derived. The main camera 610 can provide a main video 628 and the secondary camera 626 can provide a secondary video 630. The pattern 118 can be placed in a FOV of the main camera 610 and secondary cameras 626 to capture the pattern 118. The main video 628 and the secondary video 630 can include frames of the pattern 118 and can be provided to the camera calibration system 602 for generation of second camera parameters 632 in a same or similar manner as the first camera parameters 634, as disclosed herein. The second camera parameters 632 can include intrinsic and/or extrinsic parameters for the main camera 610 and the secondary camera 626. In some examples, the main camera 610 corresponds to the first camera 102 and the secondary camera 626 corresponds to second camera 104, as shown in FIG. 1. Intrinsic parameters of the second camera parameters 632 can describe characteristics inherent to the main camera 610, such as focal length and lens distortion.

For example, the augmented video generation system 608 can be configured to determine the pose data of the main camera 610. The system 608 can determine a relative pose between the portable device 622 (or the camera 626) and the main camera 610. The relative pose can be known as extrinsic parameters that can describe a spatial relationship between the portable device 622 (or the camera 626) and the main camera 610. Once the extrinsic parameters are known, the pose of the main camera 610 can be derived using the pose data 618 of the portable device 622. Since the portable device's pose (location and orientation) in a real world is determined accurately through its sensors, this information can be used as a reference point. The relative poses obtained between the portable device 622 (or the camera 626) and the main camera 610 allows for transformation of coordinates between the two devices. By applying this transformation to the pose data 618 acquired from the portable device 622, a corresponding pose of the main camera 610 can be calculated, which can be referred to as main camera pose data. Accordingly, the system 600 can leverage known relative poses between the portable device 622 (or the camera 626) and the main camera 610 to determine a pose of the main camera 610 based on the pose data 618 obtained from the portable device 622.

For example, the augmented video generation system 600 can use the main camera pose data to position the digital asset 604 into video footage (the main video 628) of a scene (a shot). For example, the system 600 can apply appropriate transformations (translation, rotation, scaling) to align the digital asset 604 with a desired location and orientation in each frame of the video footage provided by the main camera 610 to provide the augmented video 614. For example, a translation component of the main camera pose data can indicate a position of the main camera 610 in 3D space relative to a reference point or coordinate system. This information can be used by the system 608 to position the digital asset 604 within the scene by applying translations along x, y, and z axes to move the digital asset 604 to a desired location in each frame of the video footage. A rotation component of the main camera pose data can describe an orientation of the main camera 610 in 3D space. By applying rotations around the x, y, and z axes, the system 608 can orient the digital asset 604 to match a perspective of the main camera, ensuring that the digital asset 604 aligns correctly with a surrounding environment in each frame. In some examples, the digital asset 604 can be scaled and a scaling transformation can be applied by the system 608 to adjust a size or scale of the digital asset 604 relative to the scene or to simulate perspective effects.

FIG. 7 is an example of a portion of pseudocode 700 for implementing the camera calibration system 602, as shown in FIG. 7. Thus, reference can be made to one or more examples of FIGS. 1-6 in the example of FIG. 7. For example, a user can provide user input data to the camera calibration system 602 that can define a checkerboard size and a number of corners, as shown in FIG. 7. The user input data can also indicate a sensor size of each video camera that provides video footage to the camera calibration system 602. In the example of FIG. 7, cameras of two mobile phones and two non-mobile phone cameras are used to provide respective video footage. The two mobile phone cameras can be a pair and the non-mobile phone cameras can be a second pair. For each camera pair, the camera calibration system 602 can compute the camera parameters 124 according to one or more examples, as disclosed herein.

FIG. 8 is an example of a camera parameter report 800 that can be provided by the camera calibration system 602 or the camera parameter calculator 122. Thus, reference can be made to one or more examples of FIGS. 1-7 in the example of FIG. 8. In some examples, the camera parameter calculator 122 can output the camera parameters 124 in the camera parameter report 800. The camera parameter calculator 122 can output the camera parameter report 800 as a file, for example, as a Json file. Other file formats are contemplated within the scope of this disclosure.

Figure 9:
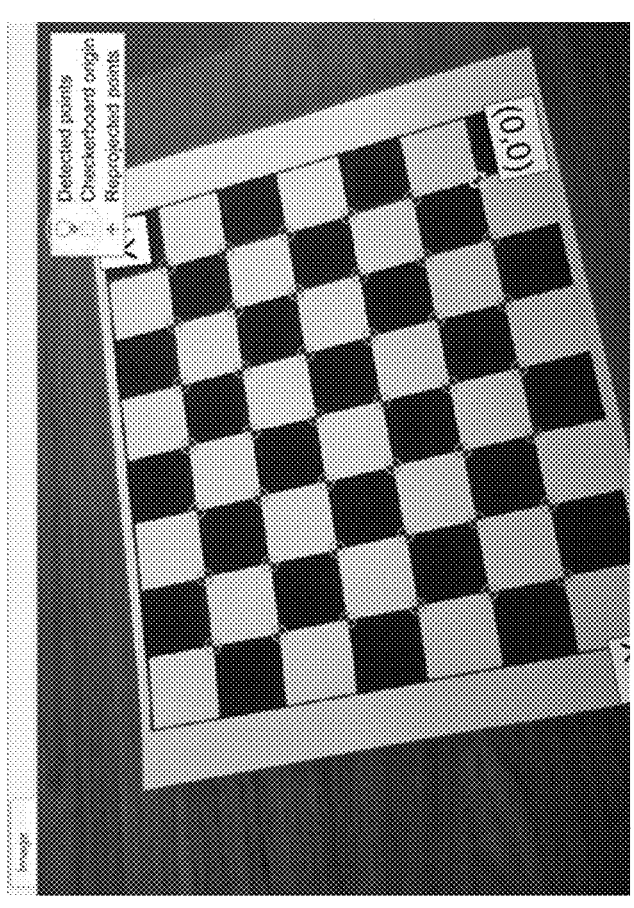
FIGS. 9-10 are examples of a graphical user interface (GUI) of a camera calibration application.
Figure 10:

FIGS. 9-10 are examples of graphical user interfaces (GUIs) 900-1000, respectively, of a camera calibration application that includes a frame of a checkerboard in which points and a checkerboard origin have been detected by the application. In some examples, the pattern 118 can correspond to the pattern 118, as shown in FIG. 1. The camera parameter calculator 122 can be implemented as part of the camera calibration application and thus configured to provide the camera parameters 124, as shown in FIG. 1 and/or the camera parameter report 800, as shown in FIG. 8. Thus, reference can be made to one or more examples of FIGS. 1-8 in the example of FIGS. 9-10. In the example of FIG. 10, two frames of the checkerboard are shown that can be provided by different cameras, such as the first and second cameras 102-104, as shown in FIG. 1.

Figure 11:
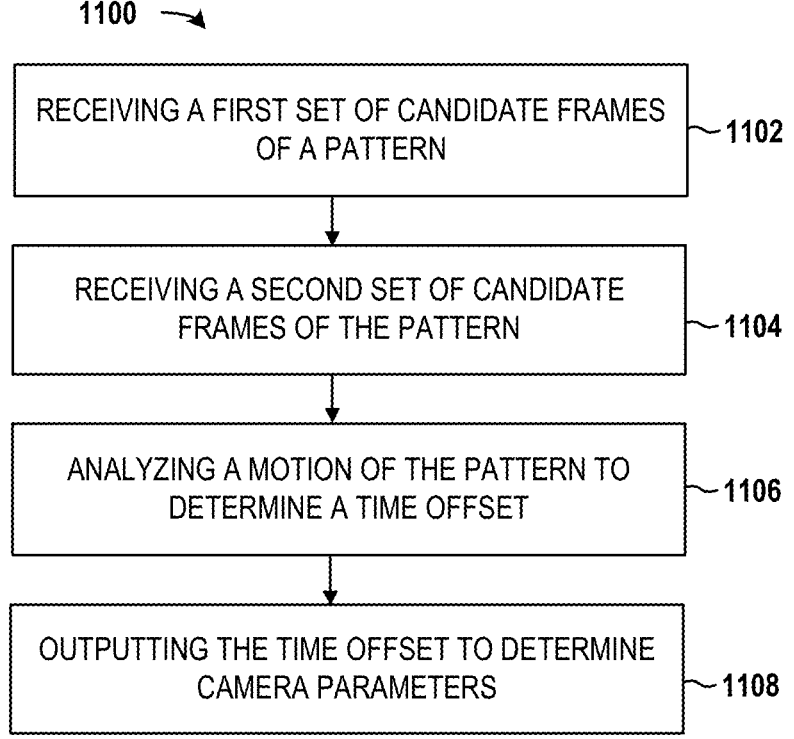
FIG. 11 is an example of a method for computing a time offset for camera calibration.
Figure 12:
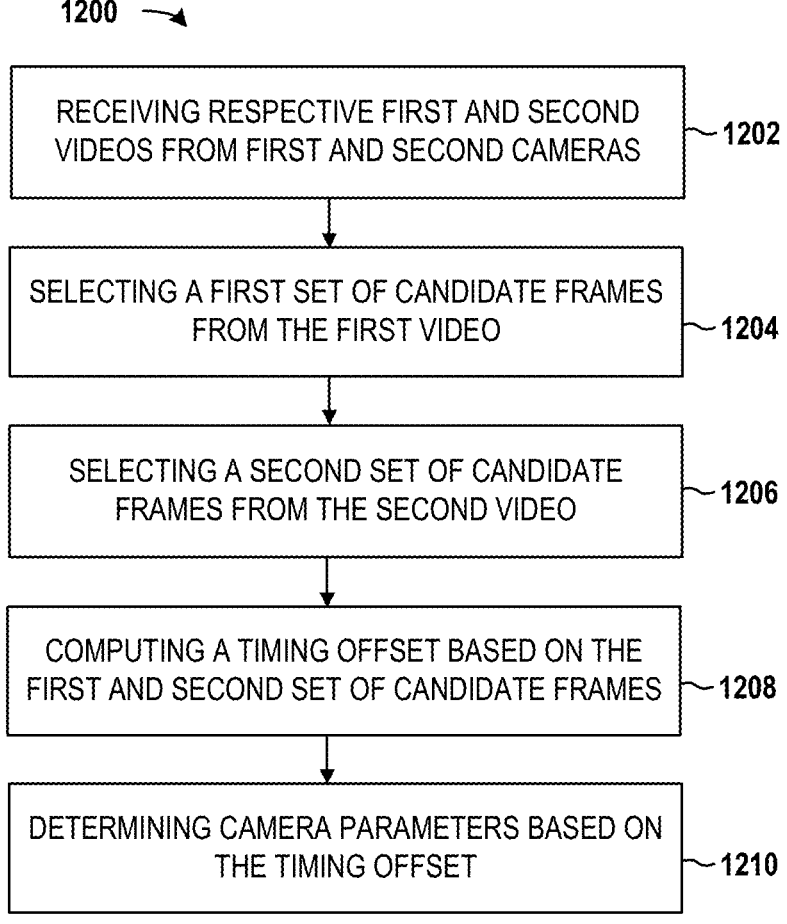
FIG. 12 is an example of a method for determining camera parameters.
Figure 13:
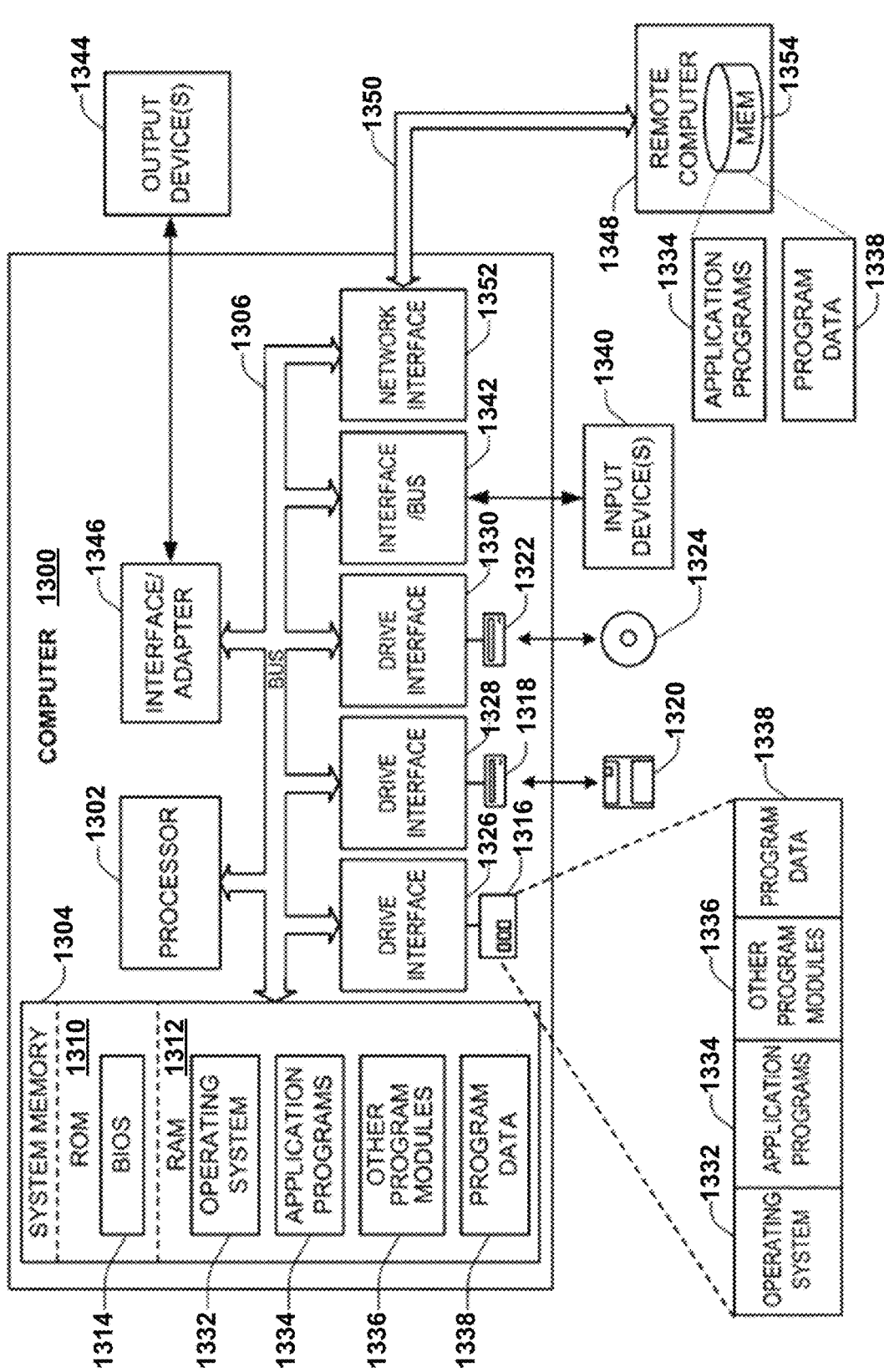
FIG. 13 is a block diagram of a computing environment that can be used to perform one or more methods according to an aspect of the present disclosure.

In view of the foregoing structural and functional features described above, example methods will be better appreciated with reference to FIGS. 11-13. While, for purposes of simplicity of explanation, the example methods of FIGS. 11-13 are shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement the method.

FIG. 11 is an example of a method 1100 for computing a time offset for camera calibration. The method 1100 can be implemented by the video synchronizer 100, as shown in FIG. 1. Thus, reference can be made to the examples of FIGS. 1-10 in the example of FIG. 11. The method 1100 can begin at 1102 with receiving (e.g., at the time offset calculator 132, as shown in FIG. 1), a first set of candidate frames (e.g., the first set of candidate frames 202, as shown in FIG. 2) that are provided based on a first video (e.g., the first video 114, as shown in FIG. 1) of a pattern (e.g., the pattern 118, as shown in FIG. 1) from a first camera (e.g., the first camera 102, as shown in FIG. 1). At 1104, a second set of candidate frames (e.g., the second set of candidate frames 202, as shown in FIG. 2) that are provided based on a second video (e.g., the second video 116, as shown in FIG. 1) from a second camera (e.g., the second camera 104, as shown in FIG. 1) can be received (e.g., by the time offset calculator 132). At 1106, a motion of the pattern across each of the first and second set of candidate frames can be analyzed (e.g., by the time offset calculator 132) to determine the time offset (e.g., the time offset 126, as shown in FIG. 1). The time offset can be indicative of a difference in recording time between two corresponding frames from the first and second set of candidate frames that depict the pattern at a particular location. At 1108, the time offset can be output (e.g., to the camera parameter calculator 122, as shown in FIG. 1) to determine camera parameters of the first and second cameras.

FIG. 12 is an example of a method 1200 for determining camera parameters. The method 1200 can be implemented by the stereo camera calibration system 602, as shown in FIG. 6. Thus, reference can be made to the examples of FIGS. 1-11 in the example of FIG. 12. The method 1200 can begin at 1202 by receiving first and second videos (e.g., the first and second videos 114-116, as shown in FIG. 1) from respective video cameras (the first and second cameras 102-104, as shown in FIG. 1). At 1204, a first set of candidate frames (e.g., the first set of candidate frames 202, as shown in FIG. 2) from the first video can be selected (e.g., by the frame selector 128, as shown in FIG. 1) based on a motion condition (e.g., the motion condition 134, as shown in FIG. 1). At 1206, a second set of candidate frames (e.g., the second set of candidate frames 204, as shown in FIG. 2) from the second video can be selected (e.g., by the frame selector 128) based on the motion condition. At 1208, a time offset (e.g., the time offset 126, as shown in FIGS. 1-2) can be computed (e.g., by the time offset calculator 132, as shown in FIG. 1) based on a motion of a pattern captured by the first and second candidate frames. In some examples, step 1208 can include step 1106-1108 of the method 1100. At 1210, the camera parameters for the one or more cameras can be determined (e.g., by the camera parameter calculator 122, as shown in FIG. 1) based on the time offset.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

In view of the foregoing structural and functional description, those skilled in the art will appreciate that portions of the embodiments may be embodied as a method, data processing system, or computer program product. Accordingly, these portions of the present embodiments may take the form of an entirely hardware embodiment, an entirely software embodiment, or an embodiment combining software and hardware, such as shown and described with respect to the computer system of FIG. 13. Thus, reference can be made to one or more examples of FIGS. 1-12 in the example of FIG. 13.

In this regard, FIG. 13 illustrates one example of a computer system 1300 that can be employed to execute one or more embodiments of the present disclosure. Computer system 1300 can be implemented on one or more general purpose networked computer systems, embedded computer systems, routers, switches, server devices, client devices, various intermediate devices/nodes or standalone computer systems. Additionally, computer system 1300 can be implemented on various mobile clients such as, for example, a personal digital assistant (PDA), laptop computer, pager, and the like, provided it includes sufficient processing capabilities.

Computer system 1300 includes processing unit 1302, system memory 1304, and system bus 1306 that couples various system components, including the system memory 1304, to processing unit 1302. Dual microprocessors and other multi-processor architectures also can be used as processing unit 1302. System bus 1306 may be any of several types of bus structure including a memory bus or memory controller, a peripheral bus, and a local bus using any of a variety of bus architectures. System memory 1304 includes read only memory (ROM) 1310 and random access memory (RAM) 1312. A basic input/output system (BIOS) 1314 can reside in ROM 1310 containing the basic routines that help to transfer information among elements within computer system 1300.

Computer system 1300 can include a hard disk drive 1316, magnetic disk drive 1318, e.g., to read from or write to removable disk 1320, and an optical disk drive 1322, e.g., for reading CD-ROM disk 1324 or to read from or write to other optical media. Hard disk drive 1316, magnetic disk drive 1318, and optical disk drive 1322 are connected to system bus 1306 by a hard disk drive interface 1326, a magnetic disk drive interface 1328, and an optical drive interface 1330, respectively. The drives and associated computer-readable media provide nonvolatile storage of data, data structures, and computer-executable instructions for computer system 1300. Although the description of computer-readable media above refers to a hard disk, a removable magnetic disk and a CD, other types of media that are readable by a computer, such as magnetic cassettes, flash memory cards, digital video disks and the like, in a variety of forms, may also be used in the operating environment; further, any such media may contain computer-executable instructions for implementing one or more parts of embodiments shown and disclosed herein. A number of program modules may be stored in drives and RAM 1312, including operating system 1332, one or more application programs 1334, other program modules 1336, and program data 1338. In some examples, the application programs 1334 can include one or more modules (or block diagrams), or systems, as shown and disclosed herein. Thus, in some examples, the application programs 1334 can include the video synchronizer 100 or the camera parameter calculator 122, as shown in FIG. 1, or one or more systems, as disclosed herein.

A user may enter commands and information into computer system 1300 through one or more input devices 1340, such as a pointing device (e.g., a mouse, touch screen), keyboard, microphone, joystick, game pad, scanner, and the like. These and other input devices are often connected to processing unit 1302 through a corresponding port interface 1342 that is coupled to the system bus, but may be connected by other interfaces, such as a parallel port, serial port, or universal serial bus (USB). One or more output devices 1344 (e.g., display, a monitor, printer, projector, or other type of displaying device) is also connected to system bus 1306 via interface 1346, such as a video adapter.

Computer system 1300 may operate in a networked environment using logical connections to one or more remote computers, such as remote computer 1348. Remote computer 1348 may be a workstation, computer system, router, peer device, or other common network node, and typically includes many or all the elements described relative to computer system 1300. The logical connections, schematically indicated at 1350, can include a local area network (LAN) and a wide area network (WAN). When used in a LAN networking environment, computer system 1300 can be connected to the local network through a network interface or adapter 1352. When used in a WAN networking environment, computer system 1300 can include a modem, or can be connected to a communications server on the LAN. The modem, which may be internal or external, can be connected to system bus 1306 via an appropriate port interface. In a networked environment, application programs 1334 or program data 1338 depicted relative to computer system 1300, or portions thereof, may be stored in a remote memory storage device 1354.

Although this disclosure includes a detailed description on a computing platform and/or computer, implementation of the teachings recited herein are not limited to only such computing platforms. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models (e.g., software as a service (SaaS, platform as a service (PaaS), and/or infrastructure as a service (IaaS)) and at least four deployment models (e.g., private cloud, community cloud, public cloud, and/or hybrid cloud). A cloud computing environment can be service oriented with a focus on statelessness, low coupling, modularity, and semantic interoperability.

Figure 14:
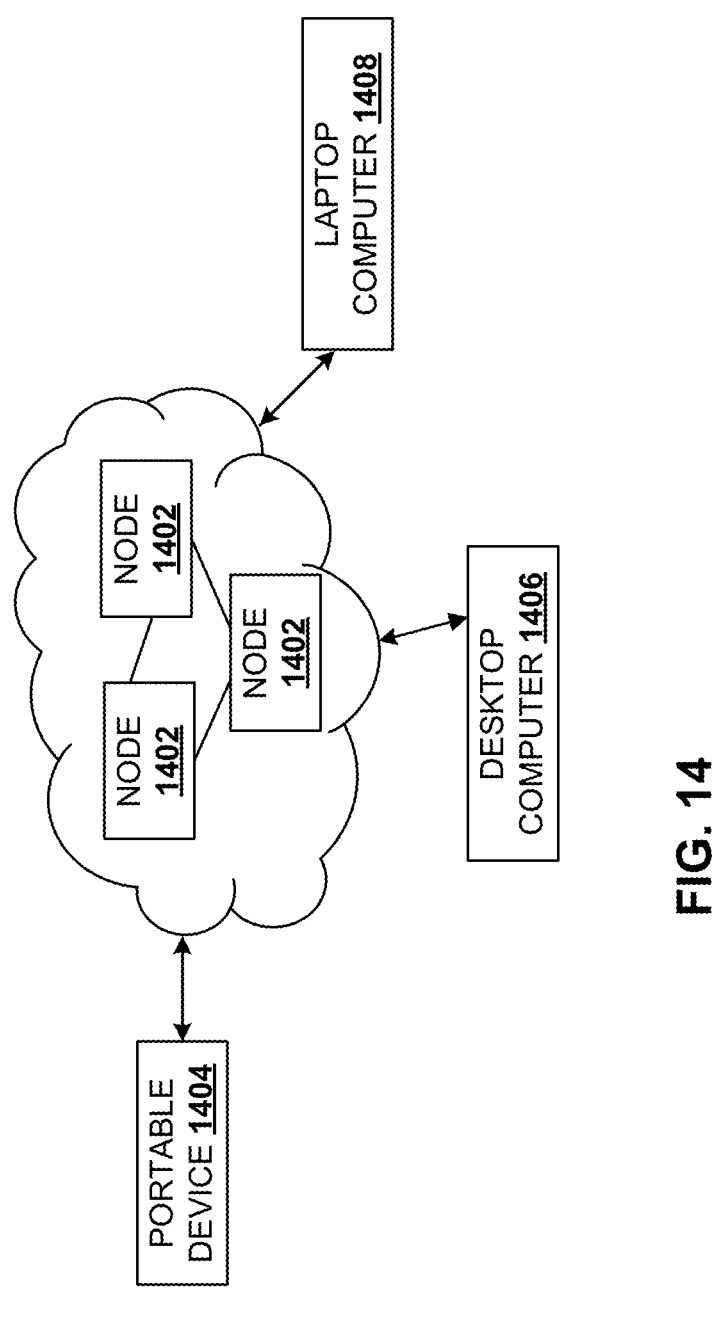
FIG. 14 is a block diagram of a cloud computing environment that can be used to perform one or more methods according to an aspect of the present disclosure.

FIG. 14 is an example of a cloud computing environment 1400 that can be used for implementing one or more modules and/or systems in accordance with one or more examples, as disclosed herein. Thus, reference can be made to one or more examples of FIGS. 1-9 in the example of FIG. 14. As shown, cloud computing environment 1400 can include one or more cloud computing nodes 1402 with which local computing devices used by cloud consumers (or users), such as, for example, personal digital assistant (PDA), cellular, or portable device 1404, a desktop computer 1406, and/or a laptop computer 1408, may communicate. The computing nodes 1402 can communicate with one another. In some examples, the computing nodes 1402 can be grouped (not shown) physically or virtually, in one or more networks, such as Private, Community, Public, or Hybrid clouds, or a combination thereof. This allows the cloud computing environment 1400 to offer infrastructure, platforms and/or software as services for which a cloud consumer does not need to maintain resources on a local computing device. The devices 1404-1408, as shown in FIG. 14, are intended to be illustrative and that computing nodes 1402 and cloud computing environment 1400 can communicate with any type of computerized device over any type of network and/or network addressable connection (e.g., using a web browser). In some examples, the one or more computing nodes 1402 are used for implementing one or more examples disclosed herein relating to root-source identification. Thus, in some examples, the one or more computing nodes can be used to implement modules, platforms, and/or systems, as disclosed herein.

In some examples, the cloud computing environment 1400 can provide one or more functional abstraction layers. It is to be understood that the cloud computing environment 1400 need not provide all of the one or more functional abstraction layers (and corresponding functions and/or components), as disclosed herein. For example, the cloud computing environment 1400 can provide a hardware and software layer that can include hardware and software components. Examples of hardware components include: mainframes; RISC (Reduced Instruction Set Computer) architecture based servers; servers; blade servers; storage devices; and networks and networking components. In some embodiments, software components include network application server software and database software.

In some examples, the cloud computing environment 1400 can provide a virtualization layer that provides an abstraction layer from which the following examples of virtual entities may be provided: virtual servers; virtual storage; virtual networks, including virtual private networks; virtual applications and operating systems; and virtual clients. In some examples, the cloud computing environment 1400 can provide a management layer that can provide the functions described below. For example, the management layer can provide resource provisioning that can provide dynamic procurement of computing resources and other resources that are utilized to perform tasks within the cloud computing environment. The management layer can also provide metering and pricing to provide cost tracking as resources are utilized within the cloud computing environment 1400, and billing or invoicing for consumption of these resources. In one example, these resources may include application software licenses. Security provides identity verification for cloud consumers and tasks, as well as protection for data and other resources. The management layer can also provide a user portal that provides access to the cloud computing environment 1400 for consumers and system administrators. The management layer can also provide service level management, which can provide cloud computing resource allocation and management such that required service levels are met. Service Level Agreement (SLA) planning and fulfillment can also be provided to provide pre-arrangement for, and procurement of, cloud computing resources for which a future requirement is anticipated in accordance with an SLA.

In some examples, the cloud computing environment 1400 can provide a workloads layer that provides examples of functionality for which the cloud computing environment 1400 may be utilized. Examples of workloads and functions which may be provided from this layer include: mapping and navigation; software development and lifecycle management; virtual classroom education delivery; data analytics processing; and transaction processing. Various embodiments of the present disclosure can utilize the cloud computing environment 1400.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof. In addition, the use of ordinal numbers (e.g., first, second, third, etc.) is for distinction and not counting. For example, the use of "third" does not imply there must be a corresponding "first" or "second." Also, as used herein, the terms "coupled" or "coupled to" or "connected" or "connected to" or "attached" or "attached to" may indicate establishing either a direct or indirect connection, and is not limited to either unless expressly referenced as such. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The term "based on" means "based at least in part on." The terms "about" and "approximately" can be used to include any numerical value that can vary without changing the basic function of that value. When used with a range, "about" and "approximately" also disclose the range defined by the absolute values of the two endpoints, e.g., "about 2 to about 4" also discloses the range "from 2 to 4." Generally, the terms "about" and "approximately" may refer to plus or minus 5-10% of the indicated number.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

The invention claimed is:

1. A method comprising:

receiving a first set of candidate frames, the first set of candidate frames being provided based on a first video of a pattern from a first camera;

receiving a second set of candidate frames, the second set of candidate frames being provided based on a second video of the pattern from a second camera;

calculating a pattern motion feature of the pattern in each candidate frame of the first and second set of candidate frames, the pattern motion feature characterizing a particular location as single average value;

analyzing a motion of the pattern across each of the first and second set of candidate frames to determine a time offset by tracking the pattern motion feature across each of the first and second set of candidate frames, the time offset being indicative of a difference in recording time between corresponding frames from the first and second set of candidate frames that depict the pattern at a particular location; and outputting the time offset to determine camera parameters of the first and second cameras based on the time offset.

2. The method of claim 1, further comprising:

selecting the first set of candidate frames from the first video based on a motion condition; and selecting the second set of candidate frames from the second video based on the motion condition.

3. The method of claim 2, further comprising computing a first motion metric for each pair of frames of the first video, the first motion metric representing an amount of motion between first and second frames of each pair of frames of the first video; and computing a second motion metric for each pair of frames of the second video, the second motion metric representing an amount of motion between first and second frames of each pair of frames of the second video.

4. The method of claim 3, wherein the first set of candidate frames are selected from the first video based on the motion condition and first motion metric, and the second set of candidate frames are selected from the second video based on the motion condition and second motion metric.

5. The method of claim 4, wherein the motion condition is a motion threshold, the first set of candidate frames are selected from the first video based on an evaluation of the first motion metric relative to the motion threshold, and the second set of candidate frames are selected from the second video based on an evaluation of the second motion metric relative to the motion threshold.

6. The method of claim 1, further comprising:

detecting the motion of the pattern across the first and second set of candidate frames; and tracking the motion of the pattern across the first and second set of candidate frames.

7. The method of claim 6, wherein analyzing the time offset comprises:

generating a first pattern motion plot characterizing the tracked motion of the pattern across the first set of candidate frames;

generating a second pattern motion plot characterizing the tracked motion of the pattern across the second set of candidate frames;

generating a motion difference plot based on the first and second pattern motion plots; and computing the time offset based on the motion difference plot.

8. The method of claim 1, further comprising matching each candidate frame from the first set of candidate frames to a corresponding frame from the second set of candidate frames depicting the pattern at the particular location to provide frame synchronization data based on the time offset, the frame synchronization data characterizing the matching of each candidate frame and the corresponding frame from the first and second set of candidate frames, respectively.

9. The method of claim 8, further comprising computing the camera parameters based on the frame synchronization data and the first and second set of candidate frames.

10. The method of claim 9, further comprising:

generating a depth map for a scene based on the camera parameters and video footage from the first and second cameras;

receiving main video footage of the scene;

receiving a digital asset; and generating augmented video data comprising the main video footage modified with the digital asset based on the depth map.

11. A method comprising:

receiving first and second videos from first and second cameras, respectively, of a pattern;

selecting a first set of candidate frames from the first video based on a motion condition;

selecting a second set of candidate frames from the second video based on the motion condition;

calculating a pattern motion feature of the pattern in each candidate frame of the first and second set of candidate frames, the pattern motion feature characterizing a particular location as single average value;

computing a time offset based on a motion of the pattern in each of the first and second set of candidate frames by tracking the pattern motion feature;

generating frame synchronization data to synchronize candidate frames from the first and second set of candidate frames based on the time offset; and computing camera parameters for the first and second cameras based on the frame synchronization data and the first and second set of candidate frames.

12. The method of claim 11, wherein to compute the time offset comprises analyzing the motion of the pattern across each of the first and second set of candidate frames, the time offset being indicative of a difference in recording time between corresponding frames from the first and second set of candidate frames that depict the pattern at a particular location.

13. The method of claim 11, further comprising:

computing a first motion metric for each pair of frames of the first video, the first motion metric representing an amount of motion between first and second frames of each pair of frames of the first video, the first set of candidate frames are selected from the first video based on the motion condition and first motion metric; and computing a second motion metric for each pair of frames of the second video, the second motion metric representing an amount of motion between first and second frames of each pair of frames of the second video, the second set of candidate frames are selected from the second video based on the motion condition and second motion metric.

14. The method of claim 11, further comprising detecting the motion of the pattern across the first and second set of candidate frames; and tracking the motion of the pattern across the first and second set of candidate frames, to compute the time offset.

15. The method of claim 11, further comprising:

generating a first pattern motion plot characterizing the motion of the pattern across the first set of candidate frames;

generating a second pattern motion plot characterizing the motion of the pattern across the second set of candidate frames;

generating a motion difference plot based on the first and second pattern motion plots; and computing the time offset based on the motion difference plot.

16. The method of claim 11, wherein the generating frame synchronization data comprises matching each candidate frame from the first set of candidate frames to a corresponding frame from the second set of candidate frames depicting the pattern at the particular location to provide frame synchronization data based on the time offset, the frame synchronization data characterizing the matching of each candidate frame and the corresponding frame from the first and second set of candidate frames, respectively.

17. The method of claim 11, further comprising:
generating a depth map for a scene based on the camera parameters and video footage from the first and second cameras;
receiving main video footage of the scene;
receiving a digital asset; and
generating augmented video data comprising the main video footage modified with the digital asset based on the depth map.

18. A method comprising:
computing a time offset based on an analysis of a motion of a pattern in first and second set of candidate frames selected from respective video streams, the time offset being indicative of a difference in recording time between corresponding frames from the first and second set of candidate frames that depict the pattern at a particular location, wherein computing the time offset comprises:
calculating a pattern motion feature of the pattern in each candidate frame of the first and second set of candidate frames, the pattern motion feature characterizing the particular location as single average value; and
tracking the pattern motion feature;
generating frame synchronization data to synchronize candidate frames from the first and second set of candidate frames based on the time offset;
computing camera parameters based on the frame synchronization data and the first and second set of candidate frames;
generating a depth map for a scene based on the camera parameters and video footage of a scene from first and second cameras; and
generating augmented video data comprising a main video footage of the scene that has been modified with a digital asset based on the depth map.

19. The method of claim 18, wherein the computing a time offset comprises:
generating a first pattern motion plot characterizing the tracked motion of the pattern across the first set of candidate frames;
generating a second pattern motion plot characterizing the tracked motion of the pattern across the second set of candidate frames; and
generating a motion difference plot based on the first and second pattern motion plots, the time offset being provided based on the motion difference plot.

20. The method of claim 18, wherein at least one of the first and second cameras is part of a portable phone.

21. A method comprising:
computing a time offset based on an analysis of a motion of a pattern in first and second set of candidate frames selected from corresponding first and second video streams, the time offset being indicative of a difference in recording time between corresponding frames from the first and second set of candidate frames that depict the pattern at a particular location, the first video stream being provided by a first camera and the second video stream being provided by a portable device, wherein computing the time offset comprises:
calculating a pattern motion feature of the pattern in each candidate frame of the first and second set of candidate frames, the pattern motion feature characterizing a particular location as single average value; and
tracking the pattern motion feature;
generating frame synchronization data to synchronize candidate frames from the first and second set of candidate frames based on the time offset; and
computing camera parameters for at least the first camera based on the frame synchronization data and the first and second set of candidate frames.

22. The method of claim 21, further comprising
receiving pose data generated by the portable device, wherein the portable device includes a camera to provide the second video stream and one or more sensors for generation of the pose data;
estimating a pose of the first camera based on the pose data for the portable device; and
generating augmented video data comprising the first video stream that has been modified with a digital asset based on the pose of the first camera and the camera parameters.

23. The method of claim 22, wherein the camera parameters includes one or more intrinsic and extrinsic camera parameters.

24. The method of claim 22, wherein the portable device is a mobile phone.

25. The method of claim 22, wherein the time offset is a first time offset and the camera parameters are first camera parameters, the method further comprising
receiving third and fourth videos from a stereo camera of a pattern;
selecting a third set of candidate frames from the third video based on a motion condition;
selecting a fourth set of candidate frames from the fourth video based on the motion condition;
computing a second time offset based on a motion of the pattern in each of the third and fourth set of candidate frames;
generating frame synchronization data to synchronize candidate frames from the third and fourth set of candidate frames based on the second time offset; and
computing second camera parameters for the stereo camera based on the frame synchronization data and the third and fourth set of candidate frames.

26. The method of claim 25, further comprising generating a depth map based on the second camera parameters and video footage of a scene from the stereo camera, the augmented video data being further generated based on the depth map.

* * * * *